3,194,675
METHOD FOR APPLYING A DECORATIVE COATING TO A METAL STRIP
Daniel T. Carter, Penn Township, Westmoreland County, and George H. Rendel, Mount Lebanon Township, Allegheny County, Pa., assignors to United States Steel Corporation, a corporation of New Jersey
Filed May 8, 1961, Ser. No. 108,392
2 Claims. (Cl. 117—26)

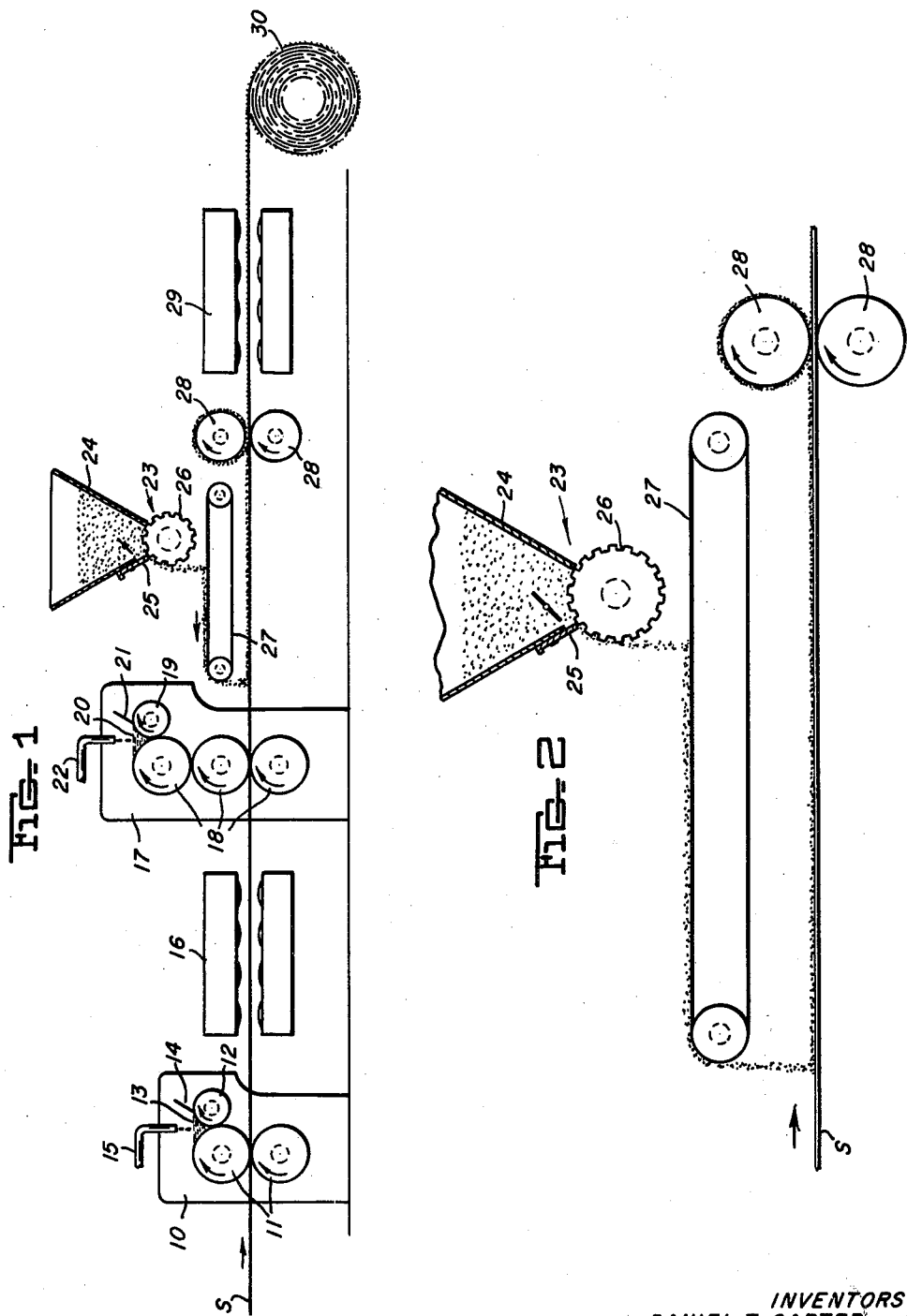

This invention relates to the coating of strip with a decorative layer of synthetic heat-curable resin having luminous or iridescent particles or flecks of reflective material therein. In particular, the invention concerns the means for and mode of introducing particles into the resin after a layer of the latter has been deposited on the strip.

In a preferred practice of our invention, we apply to strip which may be of metal or other material a coating of a plastisol of a suitable resin, as by a roller coater. We then sprinkle flecks or particles on the layer and knead them into it to ensure thorough embedding of the particles in the resin layer. We conveniently effect this by a reverse roller in contact with the resin layer which acts to pick up the resin with the particles thereon, kneading them together in so doing, and redeposit the mixture of resin and particles onto the strip in a layer of uniform thickness characterized by a more or less random distribution of particles therein.

A complete understanding of the invention may be obtained from the following detailed description and explanation which refer to the accompanying drawings illustrating the present preferred embodiment. In the drawings:

FIGURE 1 is a longitudinal sectional view showing diagrammatically a line of apparatus embodying our invention; and FIGURE 2 is a portion of FIGURE 1 to enlarged scale.

Referring in detail to the drawings, strip S, e.g., low-carbon steel strip, after being pickled and cleaned as necessary, is introduced into a primer-coating stand 10. The stand includes a pair of rollers 11, driven in opposite directions, as shown by the arrows, between which the strip is drawn. A roller 12 cooperating with upper roller 11 maintains a fountain 13 of primer therebetween and is provided with a doctor blade 14. A primer solution of heat-curable resin in a suitable solvent, is supplied to fountain 13 by pipe 15. Strip passing through stand 10 is coated with a thin film of primer on the upper surface and then enters a curing chamber 16 which may be a plurality of infra-red heaters in a suitable housing. This effects a partial drying and curing of the primer film.

The strip next enters through a finish-coating stand 17, generally similar to the primer-coating stand. Stand 17 includes a stack of contacting rolls 18 between the lower two of which, driven in opposite directions, the strip passes. A roller 19 cooperating with the upper roller 18 supports a fountain 20 of a plastisol of a suitable synthetic resin, and is provided with a doctor blade 21. The fountain is replenished through piping 22. Since the periphery of the middle roller 18 travels in a direction opposite that of the strip, it wipes onto the latter a layer of resin plastisol of substantially uniform thickness.

Immediately on leaving stand 17, the strip enters a fleck applicator 23. This includes a hopper 24 having a gate 25 adapted to feed flecks or particles under the control of a metering roller 26, onto a delivery conveyor 27. As shown, this conveyor is mounted above the path of strip S. It serves to sprinkle flecks onto the layer of plastisol resin at a point close to rollers 18.

Just beyond conveyor 27, the strip passes between kneading rollers 28 driven in opposite directions as shown. The periphery of the upper roller travels in a direction opposite to that of the strip and therefore picks up the resin layer with the flecks thereon and subsequently reapplies it to the strip with a wiping or kneading action which not only smooths the finish coating but works the flecks thoroughly thereinto. After leaving rollers 28, the strip passes through a curing chamber 29 similar to that shown at 16 and is finally coiled on a mandrel 30.

As shown in FIGURE 2, roller 26 has slots in its periphery whereby it delivers a predetermined amount of particles from hopper 24, per unit angle of rotation.

While various primer and plastisol compositions may be employed in the process of our invention, the following are typical examples:

| Resin primer solution: | Percent by weight |
|---|---|
| Bakelite phenolic resin | 28 |
| Bakelite vinyl resin | 7 |
| Bakelite epoxy resin | 5 |
| Methyl ethyl ketone | 34 |
| Methyl iso-butyl ketone | 26 |
| | 100 |
| Plastisol finish coating: | |
| Polyvinyl chloride resin | 60 |
| Di octyl phthalate | 11 |
| Di normal octyl decyl phthalate | 9 |
| Di butyl phthalate | 9 |
| Iso octyl palmitate | 2 |
| Alkyd polymeric ester plasticizer (Rohm & Haas Paraplex G–60) | 4 |
| Calcium carbonate | 2 |
| Cadmium-tin stearate | 3 |
| | 100 |

The flecks or particles may be bronze powder, aluminum foil, copper dust, steel shavings, pigmented resin such as polyethylene terephthalate, or other suitable material. They should be of a size between 0.004″ x 0.004″ and 0.002″ x 0.25″ and of a thickness approximating 0.0002″. The particles should be from 0.1 to 5% of the volume of plastisol finish coating.

Our invention is characterized by the advantage that the reflective particles are mixed intimately with the previously applied resin-plastisol layer while the latter is still plastic, as it is picked up and kneaded by roller 28, then again wiped onto the surface of the advancing strip. The particles are thus effectively embedded in the plastisol so they will improve the appearance of the coated strip yet have the surface protection afforded by the overlying plastisol.

Although we have disclosed herein the preferred embodiment of our invention, we intend to cover as well any change or modification therein which may be made without departing from the spirit and scope of the invention.

We claim:

1. A method of coating metal strip which comprises applying thereto a layer of a heat-curable resin plastisol, metering a stream of solid particles of reflective material distributed across the strip and sprinkling them onto said layer, then wiping the layer of plastisol and particles from the strip, kneading the plastisol and particles removed by the wiping action, re-applying them to the strip as a layer and thereafter heating the re-applied layer to cure it.

2. A method as defined in claim 1, characterized by effecting said wiping by causing the strip to engage a rotating roller and moving the strip in a direction opposite the travel of the roller's periphery.

(References on following page)

References Cited by the Examiner

UNITED STATES PATENTS

| | | | |
|---|---|---|---|
| 2,087,094 | 7/37 | McBurney | 117—19 X |
| 2,642,030 | 6/53 | Brink | 118—114 X |
| 2,748,019 | 5/56 | Schramm | 117—31 |
| 2,793,141 | 5/57 | Barr | 117—71 X |
| 2,931,736 | 4/60 | Park | 117—19 X |
| 3,010,845 | 11/61 | Schornstheimer | 117—111 X |
| 3,047,415 | 7/62 | Rhodes et al. | 117—132 |
| 3,070,457 | 12/62 | Lobombarde. | |

WILLIAM D. MARTIN, *Primary Examiner.*

RICHARD D. NEVIUS, *Examiner.*